United States Patent [19]

Lee

[11] Patent Number: 4,463,634

[45] Date of Patent: Aug. 7, 1984

[54] PARTS CATCHER FOR AN AUTOMATIC MACHINE

[75] Inventor: Richard C. Lee, Horsehead, N.Y.

[73] Assignee: Hardinge Brothers, Inc., Elmira, N.Y.

[21] Appl. No.: 380,878

[22] Filed: May 21, 1982

[51] Int. Cl.³ ..................... B23B 13/12; B23B 25/00
[52] U.S. Cl. ............................. 82/34 R; 82/2.5; 83/157
[58] Field of Search ............... 82/2.5, 2.7, 34 R; 29/DIG. 53, DIG. 59, DIG. 94, DIG. 96; 83/104, 106, 157, 165, 166

[56] References Cited

U.S. PATENT DOCUMENTS

| | | | |
|---|---|---|---|
| 427,869 | 5/1890 | Hurlbut | 29/DIG. 94 |
| 1,616,151 | 2/1927 | Thacher | 82/2.7 |
| 1,964,937 | 7/1934 | Dumser et al. | 82/2.7 |
| 1,970,023 | 8/1934 | Schroeder | 82/2.7 |
| 2,331,719 | 10/1943 | Oeschger | 29/DIG. 53 |
| 4,150,594 | 4/1979 | Pearson et al. | 83/104 |
| 4,183,269 | 1/1980 | Molliex | 82/2.5 |

*Primary Examiner*—Leonidas Vlachos
*Attorney, Agent, or Firm*—Shlesinger, Arkwright, Garvey & Fado

[57] ABSTRACT

A parts catcher for an automatic machine having a work holder and parts cut-off comprising a receptacle adapted to be mounted on the machine beneath the work holder and having a top and bottom with an opening in the top; the receptacle having a pivoted lid at the top thereof for covering said opening; a piston and cylinder assembly for opening and closing the lid to uncover and cover the opening; and the lid when opened being positioned beneath the work holder to catch parts when finished and cut-off and having an inclined surface for directing the caught parts into the receptacle through the opening, and programmable controls associated with the lid to cause the lid to open prior to cut-off of the finished part so as to be ready to catch the finished part when cut-off.

19 Claims, 4 Drawing Figures

PARTS CATCHER FOR AN AUTOMATIC MACHINE

This invention relates to parts catchers for automatic machines in which the finished part is directed to a receptacle automatically upon cut-off.

HISTORICAL BACKGROUND

With the advent of automatic machines, various devices have been devised for catching finished parts such as those shown in King U.S. Pat. No. 3,786,700, Scholtes U.S. Pat. No. 3,889,559, and Fortune U.S. Pat. No. 3,823,628.

The devices shown in these various patents are typical of the state of the art but do not include a mechanism for preventing chips or the like from collecting in the receptacle or bin during machining operations. Further, the devices as shown are not positioned so as to be recessed and out of the way of the operator during machine operations in order to avoid injury to the operator by coming in contact with projecting parts and the like.

OBJECTS AND SUMMARY

It is an object of this invention to provide a part catcher which is programmable.

Another object of this invention is to provide a part catcher which is pneumatically operated.

Yet a further object of this invention is to provide a part catcher which automatically opens to catch a part eliminating operator effort.

Still a further object of this invention is to provide a parts catcher which can be manually operated by the operator when required as well as automatically operated.

Still a further object of this invention is to provide a parts catcher which can be maintained close to the work and yet closed during operation to avoid collecting turning chips.

A further object of this invention is to provide a parts catcher which is durable and easy to maintain.

Still a further object of this invention is to provide a parts catcher which has an inclined top surface for deflecting chips and the like when the door is closed.

Another object of this invention is to provide a parts catcher with a door which when opened provides a chute for receipt of the finished part and is so designed as to make sure that the parts fall directly into the receptacle and not into other areas of the machine creating retrieval problems. This is done by providing walls to the chute and a proper angle for catching the part and allowing it to slide down into the receptacle.

Yet another object of this invention is to provide a parts catcher which has access means for ready retrieval of finished parts once they have dropped into the receptacle.

A further object of this invention is to provide a drain system for getting rid of any coolant which may collect in the receptacle.

Another object of this invention is to provide means for cushioning the cut-off parts as they are dropped into the receptacle.

In summary, this invention relates to a parts catcher which is compact and easily mounted beneath the work holder of an automatic machine and one which is programmable to allow it to operate when a part has been machined and is ready to be cut-off from the bar stock from which it was machined.

These and other objects and advantages of this invention will be apparent from the following detailed description taken in consideration with the accompanying drawings in which:

FIG. 3 is a top plan view of the chute or lid prior to folding of the ends to form the chute or lid and prior to mounting on the receptacle;

FIGURES 1 THROUGH 4

The housing H of the machine tool includes the spindle S supporting the chuck C which in turn grasps the bar stock or work W. Below the spindle S is the receptacle R. The receptacle R includes a front wall 2, rear wall 4, and side walls 6,8.

Figure 1:
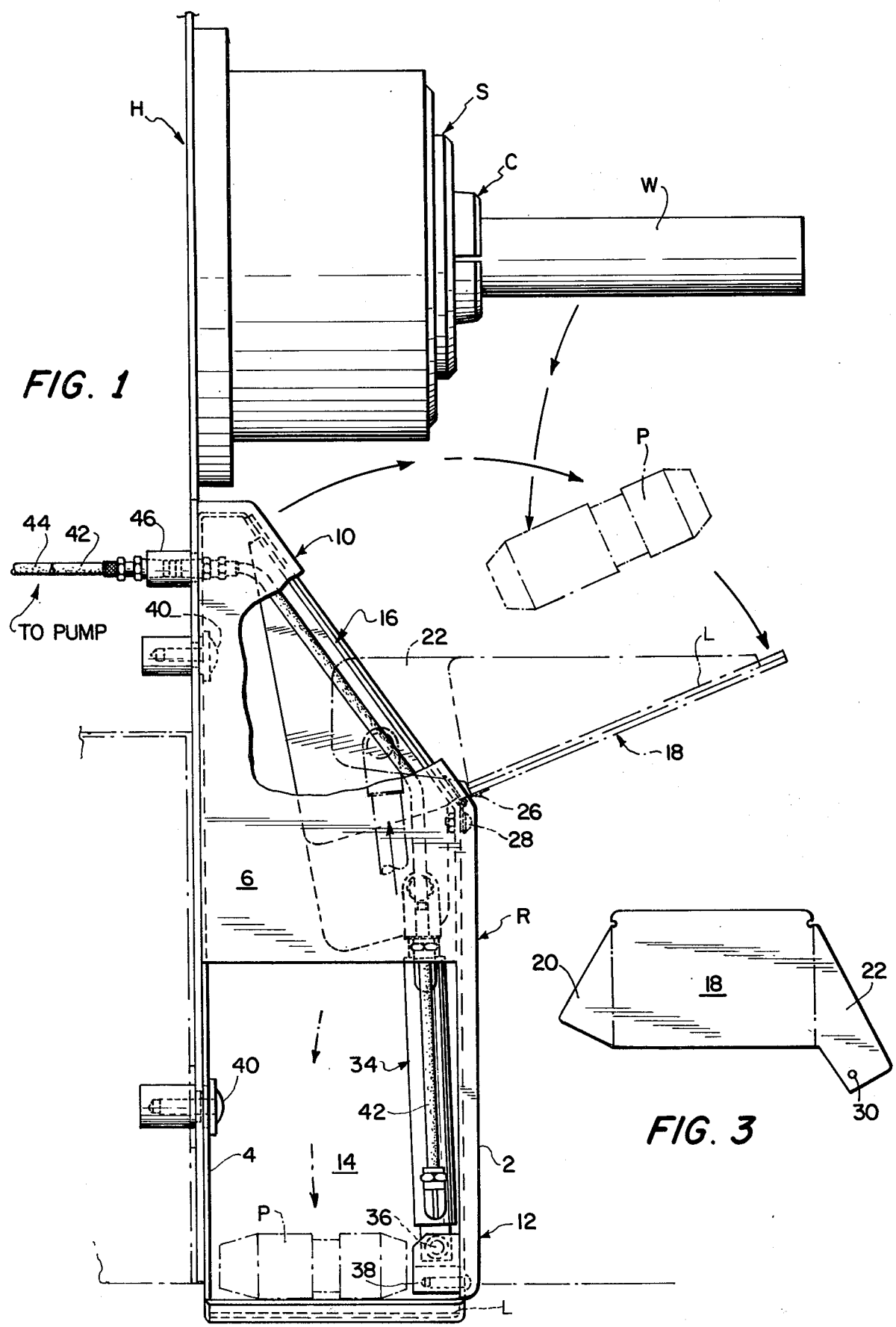
FIG. 1 is a fragmentary side elevational view of the parts catcher showing mounted on a machine with portions broken away and portions shown in phantom lines showing the opened position of the door and the catching of parts.

The top 10 of the receptacle R is inclined as best shown in FIG. 1. The bottom 12 includes an access opening 14. The inclination may be from 55° to 65° with a 60° inclination being preferred.

Figure 2:
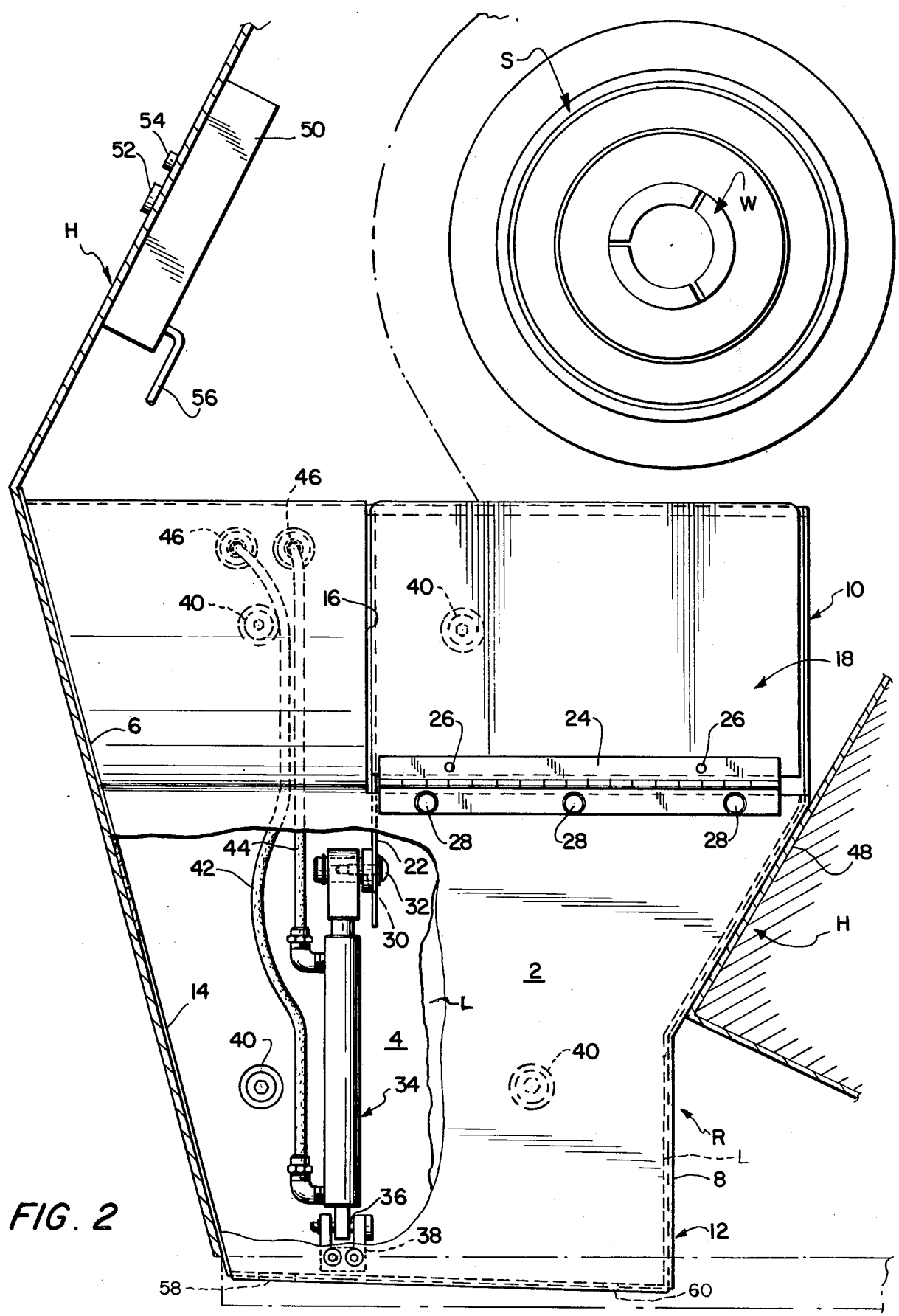
FIG. 2 is a front elevational view of a parts catcher shown mounted on a machine with portions broken away and portions shown in phantom lines.

At the top 10 of the receptacle R is an opening 16 positioned to the right of the receptacle R as best shown in FIG. 2. The opening 16 is closed by a lid or cover 18.

As best shown in FIG. 3, the lid 18 includes side walls 20,22. The lid 18 is secured to a hinge plate 24 by welding or rivets 26. Hinge plate 24 is mounted on the front wall 2 by rivets, bolts or fasteners 28. As best noted in FIGS. 2 and 3, the side wall 22 extends beyond the bottom edge of the lid 18 and is provided with an opening 30 for receipt of a threaded fastener 32 to which is pivotally mounted a piston cylinder assembly 34. The bottom of the assembly 34 is pivotally mounted on pivot pin 36 mounted on bracket 38 which is supported by the front wall 2. The entire receptacle R is fastened to the housing H by means of fasteners 40. Pneumatic hoses 42, 44 are connected to the piston cylinder assembly 34 and exit through the rear wall 4 at connector couplings 46. It should be noted in FIG. 2, that the right-hand side of the receptacle R conforms with a wall 48 of the housing H.

Mounted on the housing H are programmed controls 50 which include operating buttons 52, 54. An electrical line 56 connects the programmed controls to a pump and pump control (not shown).

Figure 4:
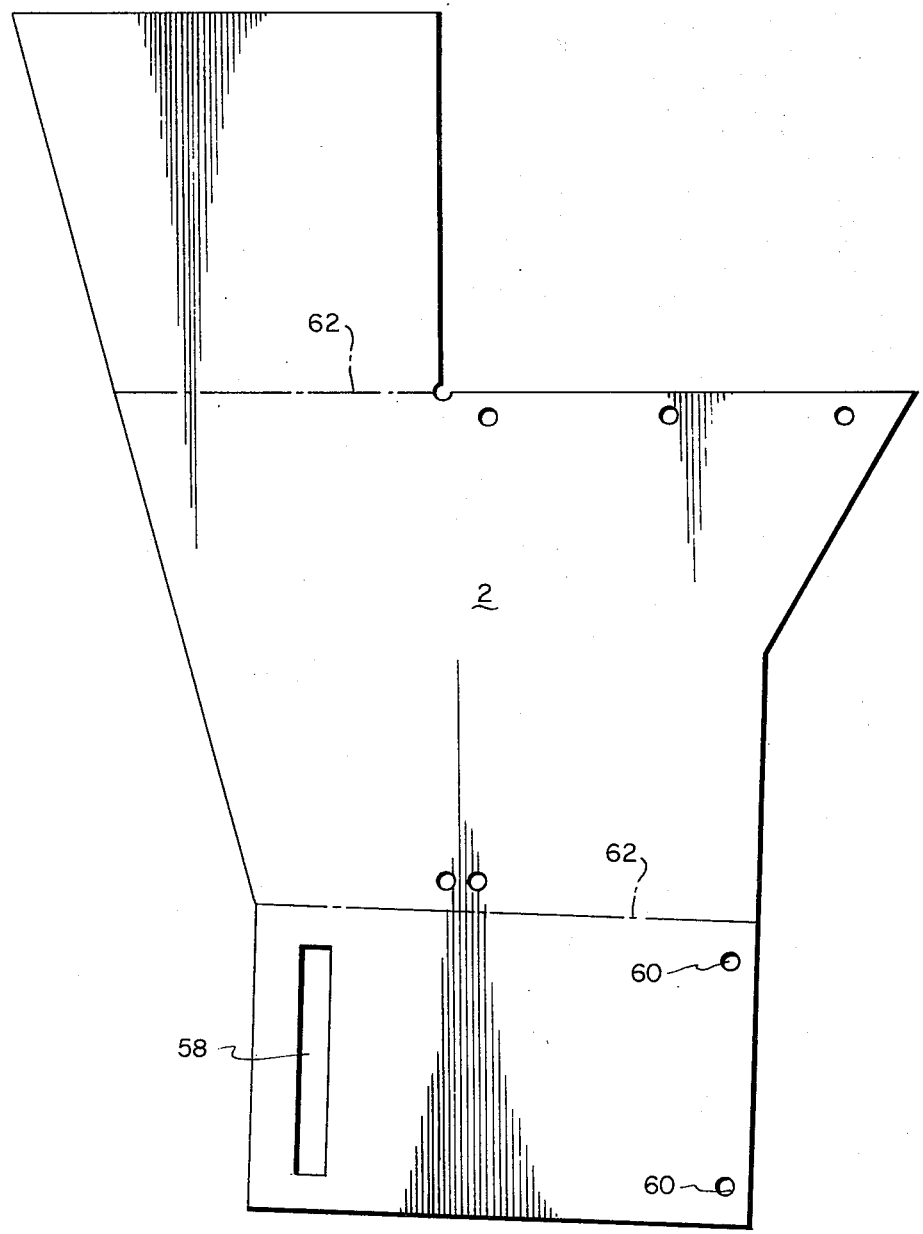
FIG. 4 is a layout plan view of the front and bottom walls prior to folding.

As best shown in FIG. 4, the bottom 12 of receptacle R includes a drainage slot 58 and drainage holes 60 for draining cutting coolant or the like which may accumulate therein. A slight slope is provided in the floor of bottom 12 as shown in FIG. 2 to further facilitate drainage.

The receptacle R preferably includes a cushioned lining L of synthetic cork adhesively or otherwise secured to the wall 2, wall 4, the floor of bottom 12, side wall 8 and the cover 18 as desired. Rubber or plastic cushioning material can also be used. This lining L cushions and protects the parts P as they drop into receptacle R.

OPERATION

In operation, the operator of the machine programs the part catcher receptacle R so that the lid or cover 18 will open in the position shown in FIG. 1 just prior to the cut-off of the finished part P. The program is sequenced by depressing button 52. Thereafter, the unit will operate automatically as each successive part P is completed so that it is directly under the part P prior to its cut-off providing a chute for the parts to the bottom 12 of the receptacle R. The parts P can then be removed through the access opening 14. The door 18 swings open to the proper angle as shown in FIG. 1 due to the operation of the piston cylinder assembly 34 on the side wall 22 of the lid or cover 18.

If the operator should desire to open the receptacle at any time other than the programmed sequence, he may do so by interrupting the program by means of button 54.

It will now be obvious that any chips or the like would normally bounce off the sloping inclined lid or door 18 during machining operation keeping the receptacle R substantially free from jamming due to turnings or the like.

It will also be obvious that the receptacle R can receive a number of finished parts P and that these can be readily removed without endangering the operator.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. A finished parts catcher for an automatic machine having a work holder and parts cut-off means, comprising:
   (a) a finished parts receptacle adapted to be mounted on said machine beneath said work holder having a top and bottom and having an opening in said top;
   (b) said receptacle having a pivoted lid at the top thereof for covering said opening during machining operations;
   (c) means disposed within said finished parts receptacle for opening and closing said lid to uncover and cover said opening after machining operation;
   (d) said lid when open being positioned beneath said work holder to catch parts when finished and cut-off and having an inclined surface for directing said caught parts into said receptacle through said opening;
   (e) control means associated with said lid to cause said lid to open prior to cut-off of the finished part so as to be ready to catch the finished part when cut-off;
   (f) said control means includes a piston and cylinder attached to said lid for opening and closing said lid;
   (g) said opening in said top extends part way of said top and the remaining part of said top is closed; and,
   (h) said piston and cylinder are located in said receptacle and beneath the closed remaining part of said top.

2. A finished parts catcher as in claim 1 and wherein:
   (a) said receptacle includes access means for removing said finished parts from said receptacle.

3. A finished parts catcher as in claim 2 and wherein:
   (a) said access means is in the bottom of said receptacle.

4. A finished parts catcher as in claim 3 and wherein:
   (a) said receptacle includes front, rear and side walls and said lid is pivoted on said front wall, and
   (b) said access means is in one of said sides.

5. A finished parts receptacle as in claim 1 and wherein:
   (a) said lid when covering said opening is inclined upwards from the horizontal.

6. A finished parts receptacle as in claim 5 and wherein:
   (a) said opening is inclined from the horizontal.

7. A finished parts receptacle as in claim 1 and wherein:
   (a) said lid includes an extension arm, and
   (b) said piston and cylinder are connected to said extension arem.

8. A finished parts receptacle as in claim 1 and wherein:
   (a) said lid includes a pair of side walls forming a chute.

9. A finished parts receptacle as in claim 8 and wherein:
   (a) one of said pair of side walls is longer than the other, and
   (b) said longer side wall is connected to said control means.

10. A finished parts receptacle as in claim 1 and wherein:
    (a) said control means further includes programmable means for operating said lid in a selected sequence automatically.

11. A finished parts receptacle as in claim 1 and wherein:
    (a) said control means includes means for operating said lid independent of said selected sequence.

12. A finished parts receptacle as in claim 1 and wherein:
    (a) said piston and cylinder are connected to said bottom of said receptacle.

13. A finished parts receptacle as in claim 1 and wherein:
    (a) said piston and cylinder are connected to said front wall at the bottom of said receptacle.

14. A finished parts receptacle as in claim 13 and wherein:
    (a) said rear wall includes openings therein, and
    (b) fluid pressure lines connected to said piston cylinder and extending through said opening in said rear wall.

15. A finished parts receptacle as in claim 1 and wherein:
    (a) said receptacle includes coolant fluid drainage means in said bottom.

16. A finished parts receptacle as in claim 15 and wherein:
    (a) said drainage means includes a slot and drainage holes.

17. A finished parts receptacle as in claim 15 and wherein:
    (a) said bottom is sloped to facilitate drainage.

18. A finished parts receptacle as in claim 1 and wherein:

(a) said receptacle includes cushioning material on the inside walls to protect the finished parts as they fall into the receptacle.

19. A finished parts receptacle as in claim 18 and wherein:
 (a) said lid includes cushioning material to protect the finished parts as they fall thereon.

* * * * *